UNITED STATES PATENT OFFICE.

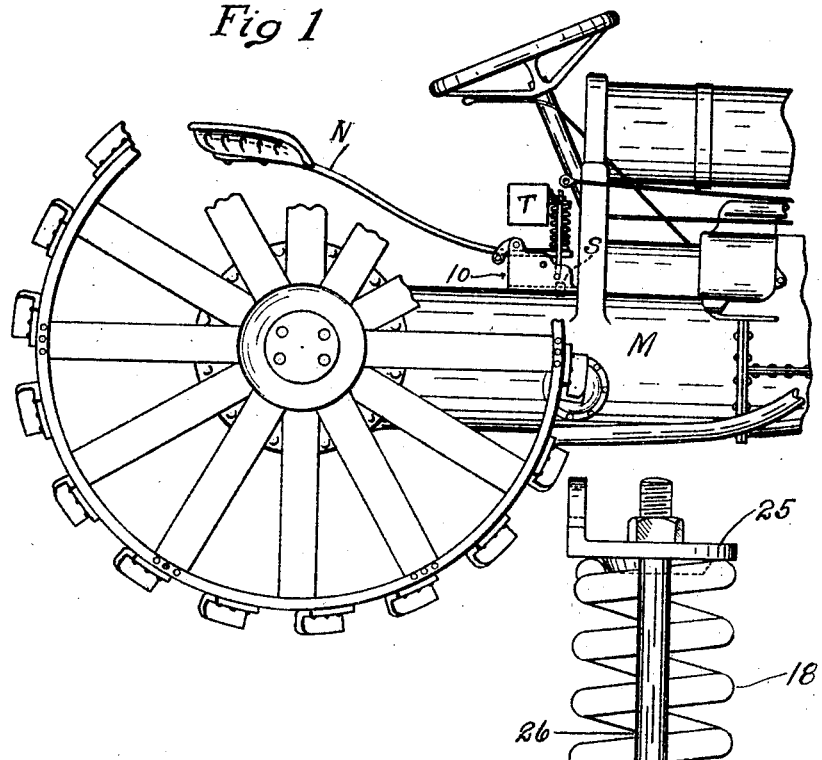
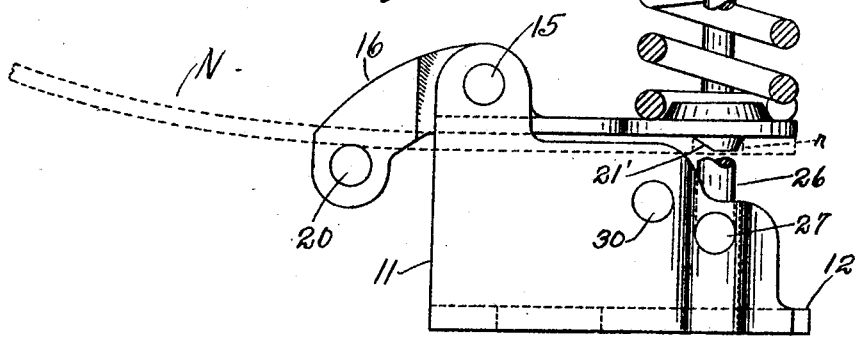

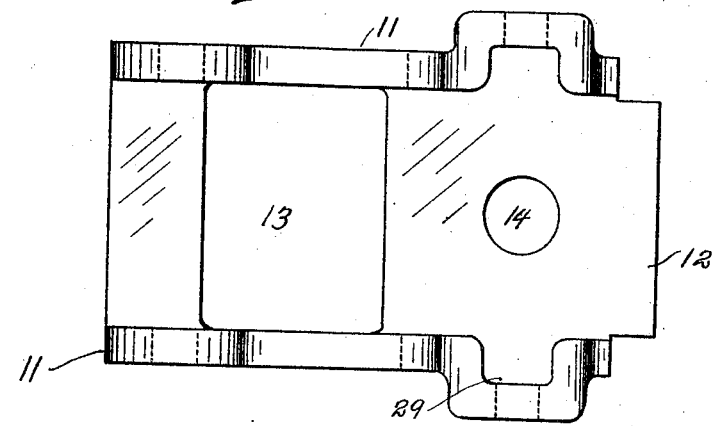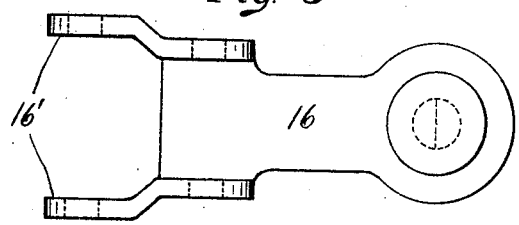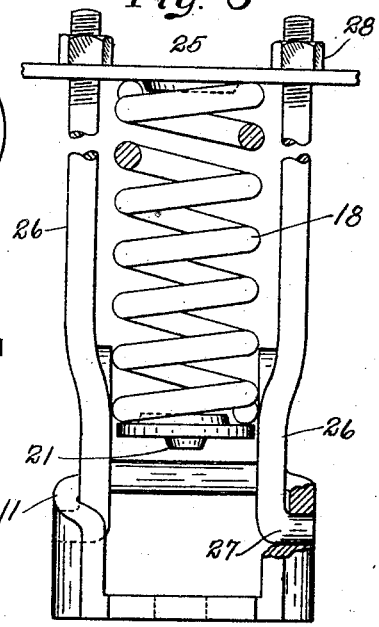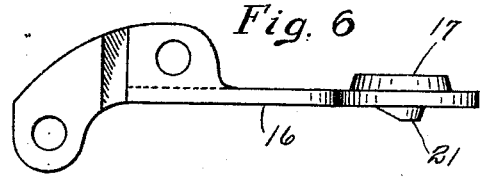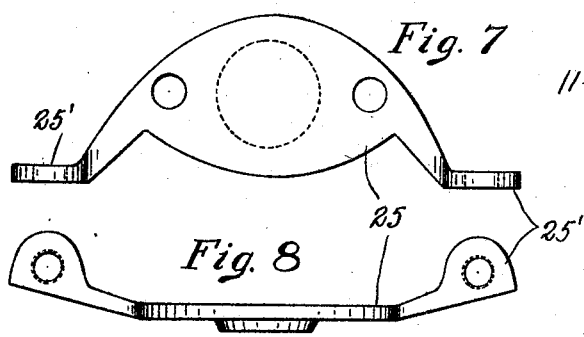

CARL A. OLSON AND OTTO S. KALLMAN, OF MINNEAPOLIS, MINNESOTA.

SHOCK ABSORBER FOR SEATS.

1,411,372.          Specification of Letters Patent.     Patented Apr. 4, 1922.

Application filed May 20, 1921. Serial No. 471,154.

*To all whom it may concern:*

Be it known that we, CARL A. OLSON, a citizen of the United States, residing at Minneapolis, in the county of Hennepin and State of Minnesota, and OTTO S. KALLMAN, a citizen of the United States, residing at Minneapolis, in the county of Hennepin and State of Minnesota, have invented a new and useful Shock Absorber for Seats, of which the following is a specification.

This invention has for its object to provide a shock-absorbing device which may be interposed between the frame of a tractor and the operator's seat thereon to absorb the jars and jolts imparted to the latter as the tractor travels over the ground. The device is primarily designed for use on a tractor known to the trade as the Fordson tractor wherein the seat is supported on a standard which is secured directly to the frame of the machine.

The device is an attachment complete in itself so constructed that it may be secured to the tractor frame by the same securing means which served to secure the seat standard to the frame, the said standard being detached from the frame and coupled to the device in seat-supporting position without any alteration of its original structural form. In other words the original seat standard is not discarded but is merely removed from the machine or tractor frame to permit the interposition of the shock absorber between said seat standard and the frame.

The various features of novelty of the invention will appear from the detailed description thereof taken in connection with the accompanying drawings forming part of the specification, reference being had to the appended claims for the scope of the invention.

In the drawings:

Fig. 1 is a view in side elevation of the rear portion of a tractor showing the invention applied thereto.

Fig. 2 is a side elevation of the shock-absorbing device parts being broken away to more clearly illustrate the construction.

Fig. 3 is an end elevation of the device shown in Fig. 2, parts being broken away.

Fig. 4 is a plan view of the main body member of the shock absorber.

Fig. 5 is a plan view of the lever forming part of the device.

Fig. 6 is a side elevation of said lever.

Fig. 7 is a plan view of the spring-abutment plate and tool-box support, and

Fig. 8 is a side elevation of the same.

Like characters of reference indicate like parts throughout the several views.

The shock absorber of the present invention is shown as applied to a well known tractor, namely, the Fordson, the frame whereof is indicated by M and the seat with its supporting standard by N. The novel shock absorber is interposed between the tractor and seat standard and is secured to the frame at the point originally occupied by said standard.

The shock absorber is indicated generally by 10. The main body of the shock absorber is of channel-like form the walls thereof being stepped and indicated by 11 and the base thereof by 12. The base is conveniently cut-out as at 13 to save material and reduce weight. 14 indicates a hole through which a securing means S is passed, said means being that originally provided for securing the seat standard to the tractor frame. Extending through the side walls 11 at the uppermost part thereof, is a pintle 15 on which is pivotally mounted a lever 16. One arm of this lever is provided with a boss or seat 17 for centering a coil or helical spring 18, the other arm being in the nature of a jaw which projects beyond the ends of the walls. Mounted in the jaw is a bridge in the nature of a cross pin 20 on which the seat standard N is adapted to rest and depending from the other end of the lever is a lug 21 with which said standard is adapted to be interlocked, all as will more fully appear hereinafter.

The coil spring 18 reacts against a plate 25 which is maintained in a fixed position relatively to the base by means of a pair of anchor rods 26 which are suitably secured to the main body member. Each anchor rod is preferably provided with a hooked end 27 which is entered into a hole in the side wall 11, the upper end of the rod passes through the plate 25, said end being threaded to receive a nut 28 whereby the tension of the spring may be varied as conditions may demand. In order to provide a channel of uniform width, the anchor rods lie within the plane of the said walls 11, the latter bulging outwardly to form a pocket or recess 29 in which the body of the anchor bolt or rod lies. The provision of a channel of uniform width between the walls 11 of the body member is necessary or desirable in order that the seat standard may be entered therebetween without the necessity of machining said standard as by making it of less width and the jaw end of the lever has the side members 16' thereof in the same plane as the side walls 11 for the same reason.

The pin 20 is positioned in the jaw below the pintle 15 and the remote end of the lever a distance sufficient to permit the seat standard to be readily assembled with the lever. In order to prevent the spring 18 from forcing the adjacent end of the lever and the standard downwardly toward the base 12 of the body to an undesirable extent, a stop pin 30 is secured in the walls 11 at a point below the lever.

The seat standard is brought into combinative association with the device by being inserted between the jaws of the lever 16 above the pin 20 and below the pintle 15 until the hole $n$ in the free end of the standard is alined with the lug 21 which then enters said hole whereby relative movement between said parts is prevented.

The seat standard and the lever 16 together form a lever of the first class which fulcrums about the pintle 15, downward movement of the seat-end of the lever being opposed by the coil spring 18 which is interposed between the fixed plate 25 and the adjacent end of the lever. The tension of the spring may be readily adjusted by turning the nuts on the threaded ends of the rods; the stop pin below said lever prevents undue depression of the same as will be readily understood. The lug 21 is preferably beveled rearwardly as at 21' from the pintle 15 to facilitate the ready entering of said lug into the hole in the free end of the seat-supporting standard.

The plate 25 is preferably provided with a pair of laterally and forwardly extending arms 25' which are perforated at their ends to receive securing means which support a tool-box T. By supporting the tool-box in this manner a very compact tool-box-and-seat support is obtained and has the advantage that the seat supporting means and tool-box can be removed from the tractor by simply removing the single securing means S which serves to confine the body member of the shock absorber to the tractor frame.

While the invention has been described with considerable particularity and has been designed with particular reference to the Fordson tractor, it is to be distinctly understood that no limitations on the invention are intended other than may be imposed by the appended claims.

Having thus described the invention what is claimed as new and desired to be secured by Letters Patent is:

1. In a shock absorber for seats, the combination of a support having a pair of spaced standards, a horizontally disposed lever fulcrumed on said standards, a spring for opposing movement of the lever in one direction, a downwardly-directed jaw at one end of the lever, and a seat-standard supporting bridge extending across said jaw.

2. In a shock absorber for seats, the combination of a support having a pair of spaced standards, a lever fulcrumed between its ends on said standards, one arm of the lever extending horizontally over the support and the other arm being a downwardly directed jaw, a seat-standard supporting bridge extending across said jaw below the level of said horizontally disposed lever arm and a spring for opposing rocking movement of the lever in one direction.

3. In a shock absorber for seats, the combination of a support having a pair of spaced standards, a lever fulcrumed between its ends on said standards, one arm of the lever extending horizontally over the support and the other arm being a downwardly directed jaw, a seat-standard supporting bridge extending across said jaw below the level of said horizontally disposed lever arm, a spring-abutment plate disposed above the horizontally extending lever arm, means securing said plate in adjustably fixed position with respect to the support, and a spring interposed between said plate and lever arm.

4. In a shock absorber for seats, the combination of a support having a pair of spaced standards, a lever fulcrumed between its ends on said standards, one arm of the lever extending horizontally over the support and the other arm being a downwardly directed jaw, a seat-standard supporting bridge extending across said jaw below the level of said horizontally disposed lever arm, a spring supported by the horizontally extending lever arm, an abutment against which the spring reacts, and an anchor rod on each side of said arm connecting said abutment to the support.

5. In a shock absorber for seats, the combination of a support having a pair of spaced upstanding walls, a horizontally disposed pintle supported by said walls, a lever hung between its ends on said pintle, one arm of the lever being horizontally disposed over said support and the other arm thereof being a downwardly-directed jaw, a seat-standard supporting bridge extending across said jaw, a lug depending from said horizontally disposed arm for interlocking engagement with a seat-supporting standard, and cushion means tending to force said last mentioned arm toward said support.

6. In a shock absorber for seats, the combination of a support having a pair of upstanding walls defining a channel of uniform width, a wall-supported pintle extending across said channel, a lever pivoted between its ends on said pintle, one arm of said lever being horizontally disposed over said support, outwardly disposed pockets in said walls adjacent one end thereof, upwardly extending rods secured in said pockets, a plate connecting the upper ends of said rods, a spring interposed between said plate and adjacent lever arm, the other arm of the lever being a downwardly-directed jaw, and a seat-standard supporting bridge extending across the jaw.

7. In a shock absorber for seats, the combination of a support having a pair of upstanding walls defining a channel of uniform width, a wall-supported pintle extending across said channel, a lever pivoted between its ends on said pintle, one arm of said lever being horizontally disposed over said support and between said walls, the other arm being a downwardly-directed jaw whose sides are in the same plane as said walls, a seat-standard supporting bridge extending across said jaw, and resilient means opposing turning movement of the lever in one direction.

In testimony whereof, we have hereunto set our hands this 17th day of May A. D. 1921.

CARL A. OLSON.
OTTO S. KALLMAN.